(12) United States Patent
Kawakita (10) Patent No.: US 8,699,992 B2
(45) Date of Patent: Apr. 15, 2014

(54) WIRELESS TERMINAL DEVICE AND COMMUNICATION CONTROL METHOD

(75) Inventor: Masaya Kawakita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 109 days.

(21) Appl. No.: 13/530,759

(22) Filed: Jun. 22, 2012

(65) Prior Publication Data

US 2012/0329421 A1 Dec. 27, 2012

(30) Foreign Application Priority Data

Jun. 24, 2011 (JP) ................................. 2011-140660

(51) Int. Cl.
*H04M 11/04* (2006.01)
(52) U.S. Cl.
USPC .................. 455/404.2; 455/404.1; 455/435.1; 455/435.3; 455/436; 455/456.1
(58) Field of Classification Search
None
See application file for complete search history.

(56) References Cited

U.S. PATENT DOCUMENTS

2011/0216645 A1* 9/2011 Song et al. .................... 370/216
2012/0014345 A1* 1/2012 Faurie et al. .................. 370/329

FOREIGN PATENT DOCUMENTS

JP 2010-147576 A 7/2010

OTHER PUBLICATIONS

"Circuit Switched (CS) fallback in Evolved Packet System (EPS); Stage 2", 3GPP TS 23.272, V10.3.1 (Apr. 2011).

* cited by examiner

*Primary Examiner* — Suhail Khan
(74) *Attorney, Agent, or Firm* — Hoffmann & Baron, LLP (57) ABSTRACT

A mobile telephone device includes: a communication switching unit that selectively switches between an LTE communication system and a CDMA communication system, for performing communication; and
a determination unit which, upon communication initiation being requested in a situation where a location registration is performed in the LTE communication system, determines whether or not the communication initiation is of a predetermined communication type; wherein
if it is determined that the communication initiation is not of the predetermined communication type, the communication switching unit changes a location registering destination by giving priority to the LTE communication system after communication is completed in the CDMA communication system, and if it is determined that the communication initiation is of the predetermined communication type, the communication switching unit continues the location registration to the CDMA communication system even after the communication is completed in the CDMA communication system.

10 Claims, 7 Drawing Sheets

WIRELESS TERMINAL DEVICE AND COMMUNICATION CONTROL METHOD

This application is based on and claims the benefit of priority from Japanese Patent Application No. 2011-140660, filed on 24 Jun. 2011, the content of which is incorporated herein by reference.

BACKGROUND OF THE INVENTION

1. Field of the Invention

The present invention relates to a wireless terminal device and a communication control method that selectively switch between communication systems.

2. Related Art

In recent years, LTE (Long Term Evolution) type communication systems have been introduced as communication systems used by wireless terminal devices such as a mobile telephone device, in addition to Circuit Switched (CS) type communication systems (for example, CDMA).

In addition, a CS Fallback function has been defined in 3GPP TS 23.272. With this function, it is possible to notify in an LTE communication system a communication arrival request from a CDMA communication system (For example, refer to 3GPP TS 23.272 V10.3.1, "Circuit Switched (CS) fallback in Evolved Packet System (EPS); Stage 2" 2011-04).

Furthermore, in a case where voice communication initiation is performed using the CS Fallback function, instruction for handover to the CDMA communication system is transmitted from the LTE communication system to a wireless terminal device in response to a communication initiation request from the wireless terminal device. The wireless terminal device that has received the handover instruction performs normal communication initiation processing after switching the wireless to the CDMA communication system.

In addition, a technique is proposed which, when a voice call is completed after performing handover to an CDMA communication system, performs handover to an LTE communication system again, which is given priority over the CDMA communication system (for example, refer to JP2010-147576A).

SUMMARY OF THE INVENTION

An object of the present invention is to provide a wireless terminal device and a communication control method that can communicate more efficiently.

The wireless terminal device according to the present invention includes: a communication switching unit that selectively switches between a first communication system and a second communication system, for performing communication; and a determination unit which, upon communication initiation being requested in a situation where a location registration is performed in the first communication system, determines whether or not the communication initiation is of a predetermined communication type of which positioning in the second communication system is requested after the communication initiation; wherein if it is determined by the determination unit that the communication initiation is not of the predetermined communication type, the communication switching unit changes a location registering destination by giving priority to the first communication system after communication based on the communication initiation is completed in the second communication system, and if it is determined that the communication initiation is of the predetermined communication type, the communication switching unit continues the location registration to the second communication system even after the communication based on the communication initiation is completed in the second communication system.

In addition, it is preferable if, in a case where it is determined that the communication initiation is of the predetermined communication type by the determination unit and the positioning request is received prior to elapse of a predetermined time period, since the communication based on the communication initiation is completed in the second communication system, the communication switching unit transmits location information, and changes the location registering destination by giving priority to the first communication system after the transmission of the location information is completed.

In addition, it is preferable if, in a case where it is determined that the communication initiation is of the predetermined communication type by the determination unit and a predetermined time period elapses without receiving the positioning request since the communication based on the communication initiation is completed in the second communication system, the communication switching unit changes the location registering destination by giving priority to the first communication system.

In addition, it is preferable if, upon changing the location registering destination between the first communication system and the second communication system, the communication switching unit receives supplementary information for changing a connection counterpart from a control device of the first communication system that has knowledge of a locational relationship between a first communication area section in the first communication system and a second communication area section in the second communication system.

In addition, it is preferable if the predetermined communication type is an emergency call.

In addition, it is preferable if the predetermined communication type is SMS (short messaging service).

In addition, it is preferable if the first communication system is of an LTE type and the second communication system is of a CDMA type.

In addition, it is preferable if the first communication system is of a WiMAX type and the second communication system is of a CDMA type.

In addition, it is preferable if the first communication system is of an LTE type and the second communication system is of a CDMA type, and the reception of the supplementary information complies with a CS-Fallback function defined in 3GPP TS 23.272.

The communication control method according to the present invention is a communication control method of a wireless terminal device, the method including: a communication switching step that selectively switches between a first communication system and a second communication system, for performing communication; and a determination step which, upon communication initiation being requested in a situation where a location registration is performed in the first communication system, determines whether or not the communication initiation is of a predetermined communication type of which positioning in the second communication system is requested after the communication initiation; wherein if it is determined in the determination step that the communication initiation is not of the predetermined communication type, a location registering destination is changed in the communication switching step by giving priority to the first communication system after communication based on the communication initiation is completed in the second communication system, and if it is determined that the communication initiation is of the predetermined communication type, the location registration to the second communication system is continued in the communication switching step even after the communication based on the communication initiation is completed in the second communication system.

Upon being requested communication initiation in a situation where a location registration is performed in a first communication system, in a case where the communication initiation requests positioning by a second communication system after the communication initiation, the wireless terminal device according to the present invention does not switch to the first communication system even after completing communication based on the communication initiation in the second communication system.

According to the present invention, the wireless terminal device can communicate more efficiently.

DETAILED DESCRIPTION OF THE INVENTION

Hereafter, an example of the embodiment of the present invention will be described. It should be noted that, in the present embodiment, a mobile telephone device 1 will be described as an example of a wireless terminal device.

Figure 1:
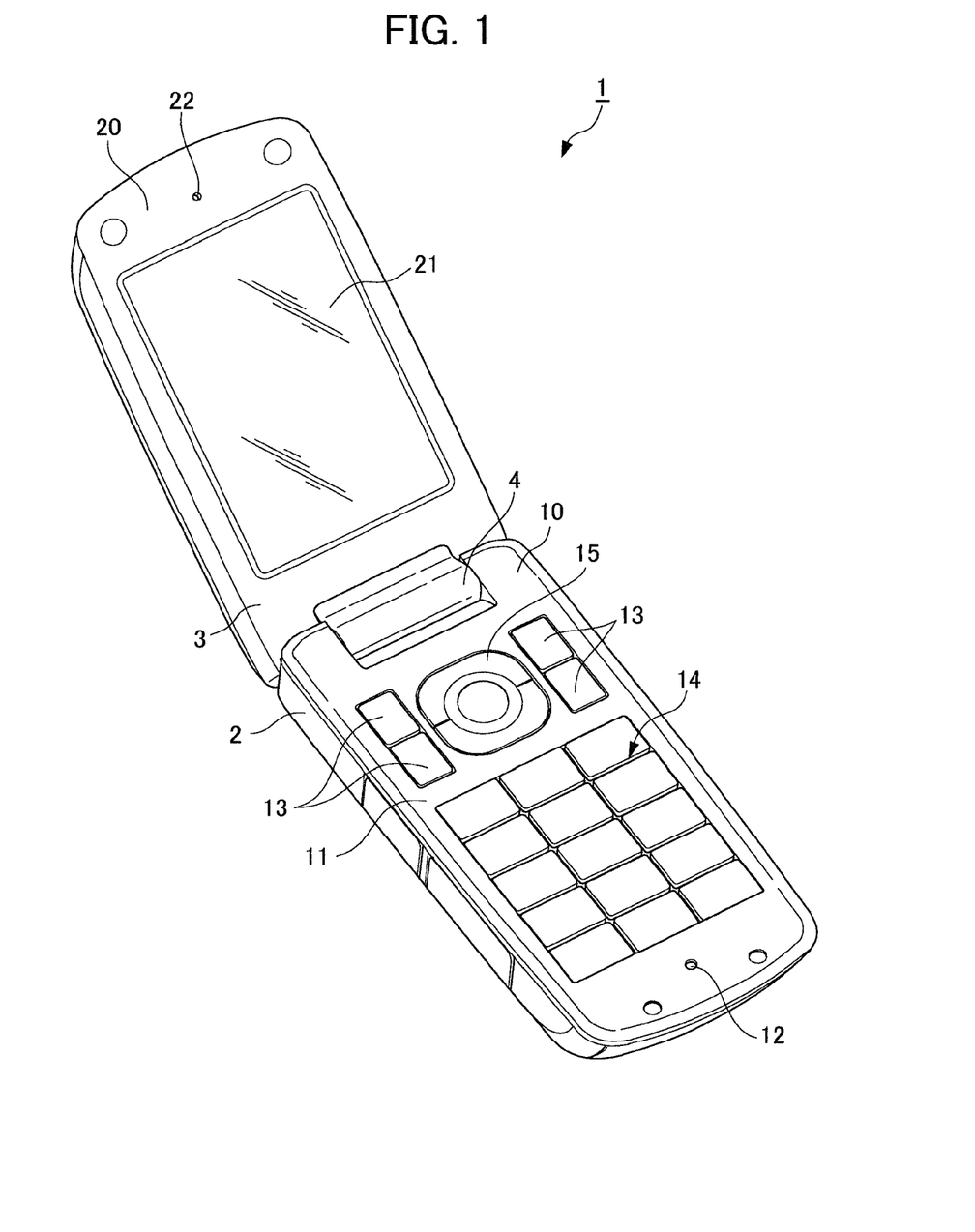
FIG. 1 is an external perspective view of a mobile telephone device according to an embodiment of the present invention.

FIG. 1 is an external perspective view of the mobile telephone device 1 according to the present embodiment.

It should be noted that, although FIG. 1 shows an embodiment of a so-called folder type mobile telephone device, the embodiment of the mobile telephone device according to the present invention is not limited thereto. For example, the mobile telephone device may be of: a slider type in which one of the bodies slides to one direction in a state in which the bodies are mutually superimposed; a rotating (turning) type in which one of the bodies is rotated around an axis line along the direction of superimposing the bodies; and a type (straight type) in which an operation unit and a display unit are disposed in one body without having a connecting portion.

The mobile telephone device 1 is configured to include an operation unit side body 2 and a display unit side body 3. The operation unit side body 2 is configured to include, on a surface portion 10 thereof, an operation unit 11 and a microphone 12 to which sound produced by a user of the mobile telephone device 1 is input when the user is having a telephone call or using a speech recognition application. The operation unit 11 is configured to include: function setting operation buttons 13 for activating various functions, such as various setting functions, a phonebook function, an SMS (short message service) function, and an e-mail function; input operation buttons 14 for inputting digits of a telephone number, characters for an e-mail, or the like; and a determination operation button 15 for performing determinations in various operations, scrolling, or the like.

In addition, the display unit side body 3 is configured to include, on the surface portion 20 thereof: a display unit 21 for displaying a variety of information; and a receiver 22 for outputting voice of the other party of the call.

In addition, an upper end of the operation unit side body 2 and a lower end of the display unit side body 3 are interconnected via a hinge mechanism 4. Furthermore, by rotating the operation unit side body 2 and the display unit side body 3 relatively to each other, which are interconnected via the hinge mechanism 4, the mobile telephone device 1 can be in a state where the operation unit side body 2 and the display unit side body 3 are opened with respect to each other (opened state), and a state where the operation unit side body 2 and the display unit side body 3 are folded together (closed state).

Figure 2:
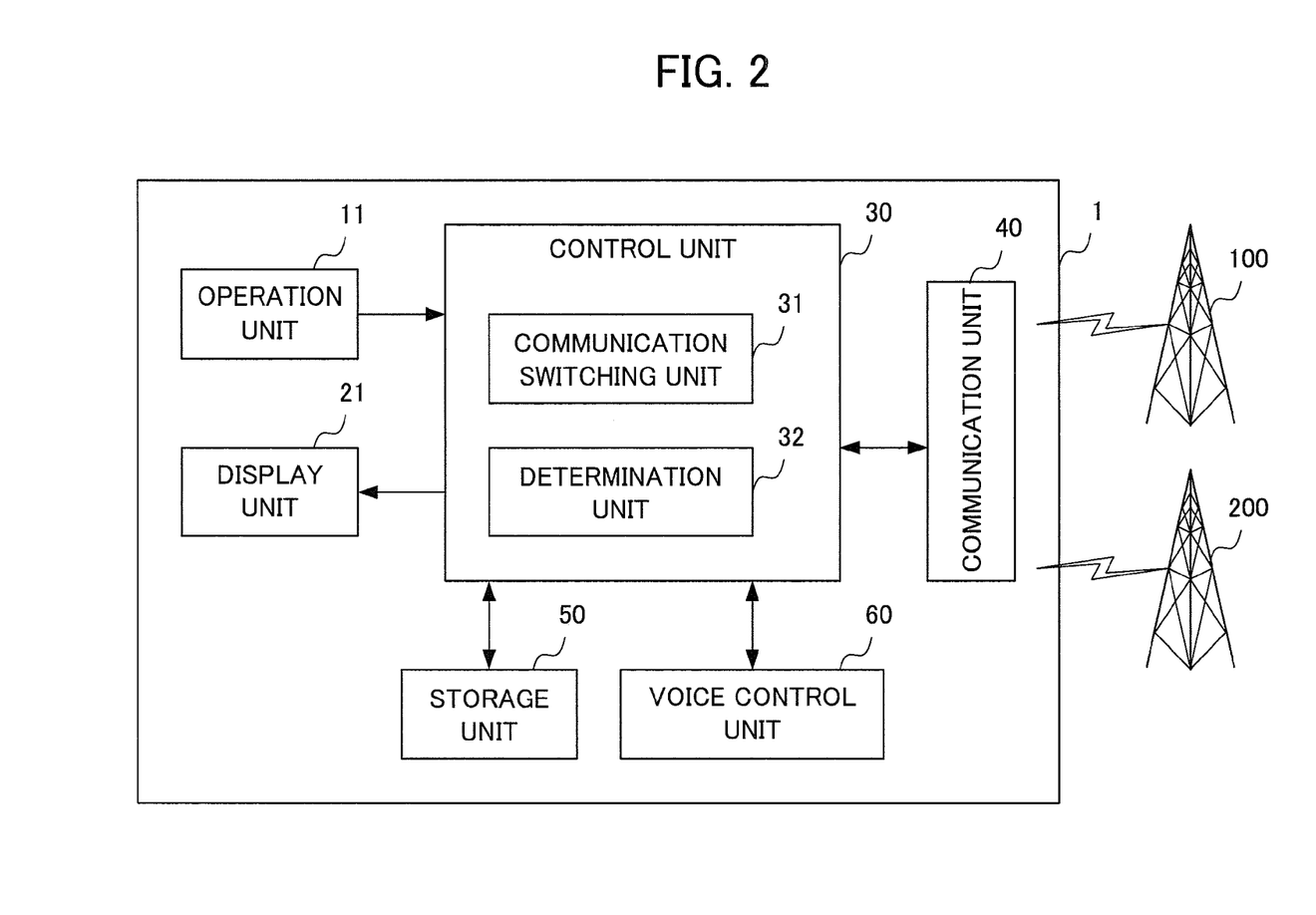
FIG. 2 is a block diagram showing functions of the mobile telephone device according to the embodiment of the present invention.

FIG. 2 is a block diagram showing functions of the mobile telephone device 1 according to the present embodiment.

The mobile telephone device 1 includes the operation unit 11, the display unit 21, the control unit 30, the communication unit 40, the storage unit 50, and the voice control unit 60.

The control unit 30 controls the entire mobile telephone device 1, and for example, performs predetermined control over units such as the display unit 21 and the communication unit 40. In addition, the control unit 30 executes a variety of processing by receiving inputs from the operation unit 11, the communication unit 40, or the like. Moreover, upon executing the processing, the control unit 30 controls the storage unit 50, and reads various programs and data and writes data. It should be noted that the detailed functions of the control unit 30 according to the present embodiment will be described later.

The communication unit 40 communicates with an external device (a base station 100 of the LTE communication system or a base station 200 of the CDMA communication system) using a predetermined utilizing frequency band (for example, 2 GHz band and 800 MHz band). Moreover, the communication unit 40 demodulates a signal received from an antenna and supplies the signal thus processed to the control unit 30, and furthermore modulates the signal supplied from the control unit 30 and transmits the signal from the antenna to the external device.

Here, in the present embodiment, since the communication unit 40 conforms to both W-CDMA or CDMA2000_1x, which is a communication protocol for voice and data communications (hereinafter "CDMA"), and LTE, which is a communication protocol mainly used for high speed data communication, it is possible to communicate with a communication system of either one of the protocols. The communication unit 40 communicates with the base station with any one of the protocols by selectively switching among a plurality of communication systems, which provide mutually overlapping communication areas based on an instruction from the control unit 30. It should be noted that, the mobile telephone device 1 gives priority to communication using an LTE communication system of an LTE standard (first communication system) at the time of data communication, and switches to communication using a CDMA communication system of a CDMA standard (second communication system) at the time of voice call or transmission and reception of SMS.

It should be noted that SMS is a function for transmitting and receiving a short message (about several tens of characters) to and from a communication counterpart. This SMS uses communication initiation and communication arrival sequences, which are partly in common with voice communication, and a transmission counterpart is identified with a telephone number in the CDMA communication system.

The storage unit 50 includes a working memory, for example, and is used for arithmetic processing by the control unit 30. In addition, the storage unit 50 stores various programs and the like in accordance with the present embodiment. Furthermore, the storage unit 50 stores a positioning information untransmitted flag, which will be described later, and the like.

The voice control unit 60 performs predetermined voice processing on a signal supplied from the communication unit 40 according to the control of the control unit 30, and outputs to the receiver 22 the signal thus processed. The receiver 22 externally outputs the signal transmitted from the voice control unit 60. It should be noted that this signal may be outputted from a loudspeaker, in place of the receiver 22 or in addition to the receiver 22. In addition, the voice control unit 60 processes the signal inputted from the microphone 12 according to the control of the control unit 30, and outputs to the communication unit 40 the signal thus processed. The communication unit 40 performs predetermined processing on a signal transmitted from the voice control unit 60 and outputs the signal thus processed from the antenna.

Next, the function of the control unit 30 and control devices of each communication system will be described in detail.

The control unit 30 includes a communication switching unit 31 and a determination unit 32.

The communication switching unit 31 performs communication by selectively switching between the LTE communication system that does not support voice communication initiation or SMS and the CDMA communication system that supports voice communication initiation or SMS and controlling the communication unit 40.

In addition, upon changing a location registering destination between an LTE communication system and a CDMA communication system, the communication switching unit 31 receives supplementary information for changing the connection counterpart from the control device of the LTE communication system, which has knowledge of a locational relationship between a first communication area section (calling zone) in the LTE communication system and a second communication area section in the CDMA communication system.

When voice communication initiation is requested in a situation where a location registration is performed in the LTE communication system, the determination unit 32 determines whether or not this voice communication initiation is of a predetermined communication type where positioning is requested in the CDMA communication system after the request for voice communication initiation. Here, the predetermined communication type is an emergency call to police, fire authorities, or the like. Alternatively, the predetermined communication type may be SMS transmission (communication initiation) to a predetermined counterpart who desired to have knowledge of a location of the mobile telephone device 1.

Here, if it is determined by the determination unit 32 that the communication is not of the predetermined communication type, the communication switching unit 31 changes the location registering destination by giving priority to the LTE communication system upon completing a telephone call based on voice communication initiation in the CDMA communication system. Meanwhile, if it is determined that the communication is of the predetermined communication type, the communication switching unit 31 continues the location registration to the CDMA communication system even after the call based on voice communication initiation is completed in the CDMA communication system.

In addition, in a case where it is determined by the determination unit 32 that the communication is of the predetermined communication type, when location information is transmitted in response to receiving a positioning request from when communication based on communication initiation of voice or SMS (call and transmission) is started in the CDMA communication system until a predetermined time period (for example, 20 seconds) elapses from the completion of the communication, the communication switching unit 31 changes the location registering destination by giving priority to the LTE communication system after completing the communication and the transmission of the location information. Furthermore, in a case where a predetermined time period has elapsed after completing the communication without receiving a positioning request, the communication switching unit 31 changes the location registering destination by giving priority to the LTE communication system.

Figure 3:
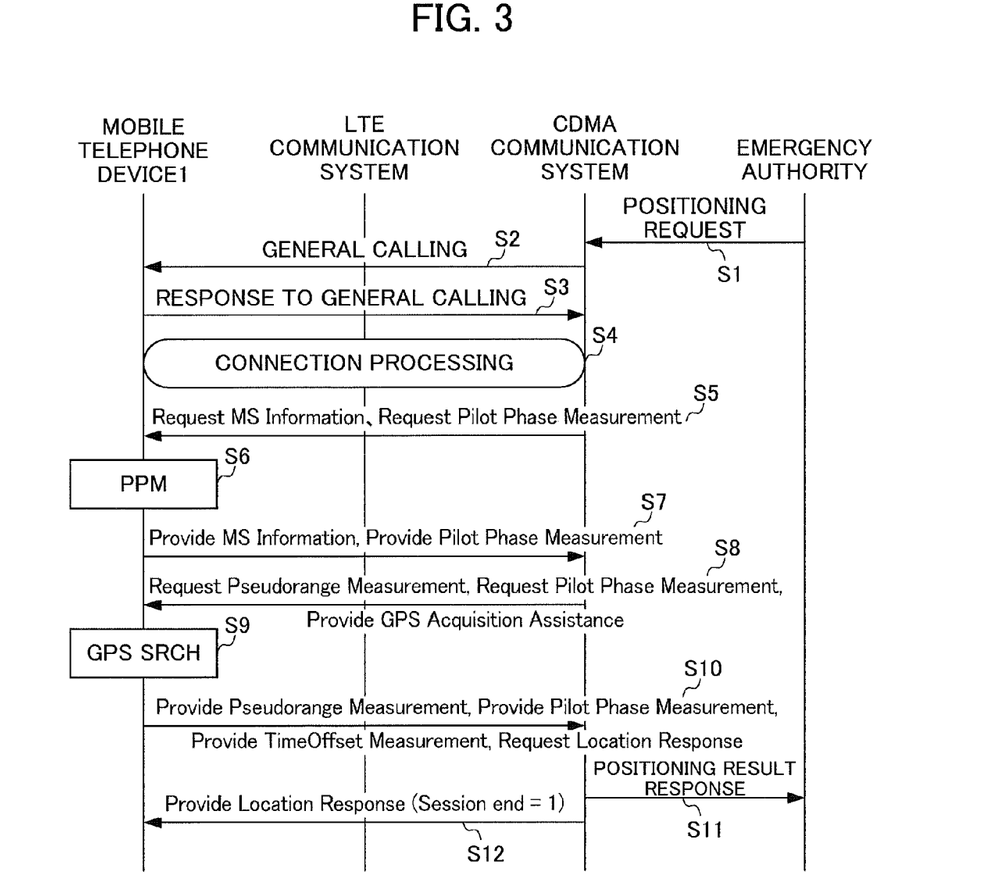
FIG. 3 is a sequence diagram showing processing in which a mobile telephone device according to the embodiment of the present invention performs positioning based on positioning request during a communication standby state in the CDMA communication system.

FIG. 3 is a sequence diagram showing processing for performing positioning based on a positioning request during when the mobile telephone device 1 according to the present embodiment is in a communication standby state in the CDMA communication system.

In Step S1, the control device of the CDMA communication system receives a positioning request signal from an emergency authority, which is a communication initiation destination of the emergency call or the transmission destination of SMS.

In Step S2, the mobile telephone device 1 receives a general calling signal that is notified from the control device of the CDMA communication system according to the positioning request in Step S1.

In Step S3, the mobile telephone device 1 transmits to the CDMA communication system a reply signal to the general calling in response to the general calling in Step S2.

In Step S4, the mobile telephone device 1 performs connection processing to the CDMA communication system and starts a session for data communication related to GPS positioning.

In Step S5, the control device of the CDMA communication system transmits to the mobile telephone device 1 a signal that requests terminal information and electric field intensity information (Request MS Information and Request Pilot Phase Measurement).

In Step S6, the mobile telephone device 1 measures the electric field intensity from adjacent base stations (PPM: Pilot Phase Measurement).

In Step S7, the mobile telephone device 1 transmits to the control device of the CDMA communication system a signal providing the terminal information and field intensity information (Provide MS Information and Provide Pilot Phase Measurement).

In Step S8, the communication control device of the CDMA communication system transmits to the mobile telephone device 1 a signal providing supplementary information for performing a GPS satellite search (Provide GPS Acquisition Assistance) together with a signal requesting the search result information of the GPS satellite and the electric field intensity information (Request Pseudorange Measurement and Request Pilot Phase Measurement).

In Step S9, the mobile telephone device 1 performs a search for GPS satellite (GPS SRCH) and receives a signal from the captured GPS satellite.

In Step S10, the mobile telephone device 1 transmits to the control device of the CDMA communication system: a signal providing the search result information on the GPS satellite (Provide Pseudorange Measurement); a signal providing electric field intensity information (Provide Pilot Phase Measurement); a signal providing time offset information (Provide TimeOffset Measurement); and a signal requesting a response of the positioning result (Request Location Response).

In Step S11, the control device of the CDMA communication system performs a positioning calculation and replies to the emergency authority the result of GPS positioning.

In Step S12, the control device of the CDMA communication system transmits to the mobile telephone device 1 a signal providing the result of GPS positioning (Provide Location Response). At this time, a flag indicating termination of the session is set (Session end=1).

Figure 4:
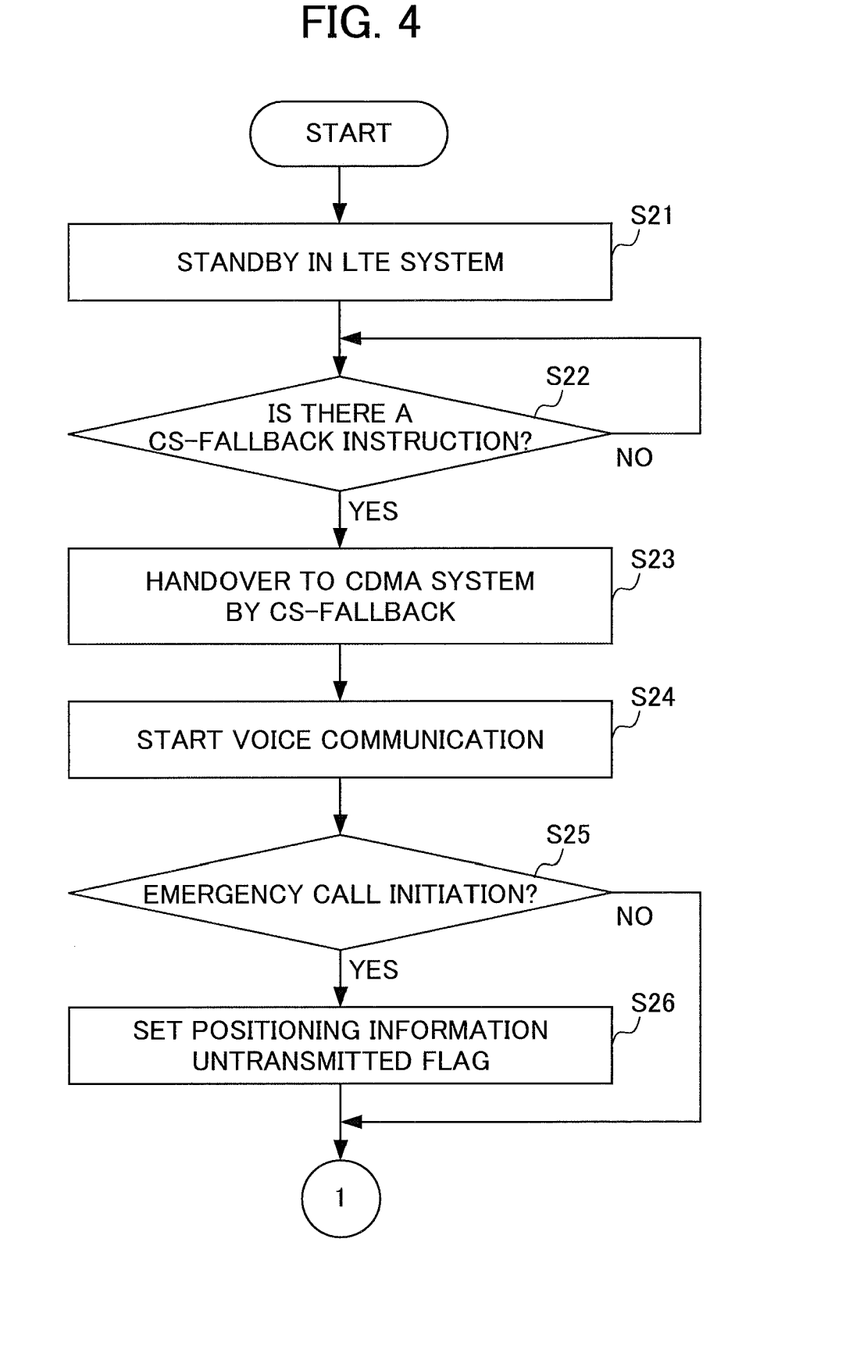
FIG. 4 is a flow chart showing processing for starting a voice communication in response to a voice communication initiation request in the mobile telephone device according to the embodiment of the present invention.

FIG. 4 is a flow chart showing the processing for starting voice communication according to a voice communication initiation request in the mobile telephone device 1 according to the present embodiment. It should be noted that the same can be described for SMS communication initiation.

In Step S21, if there is no request for voice or SMS communication, the control unit 30 (communication switching unit 31) brings the state to a communication standby state in the LTE communication system, which is given priority over the CDMA communication system.

In Step S22, the control unit 30 (communication switching unit 31) determines whether or not there has been a handover instruction based on the CS Fallback function in accordance with communication initiation of voice or SMS. If the determination is YES, the process proceeds to Step S23, and if the determination is NO, Step S22 is continued and the control unit 30 waits for a handover instruction.

In Step S23, the control unit 30 (communication switching unit 31) performs handover to the CDMA communication system by way of the CS Fallback function.

In Step S24, the control unit 30 establishes connection for voice communication or SMS transmission in the CDMA communication system and starts the voice communication or SMS transmission.

In Step S25, the control unit 30 (determination unit 32) determines whether or not the started communication is based on emergency call initiation (or SMS transmission). If the determination is YES, the process proceeds to Step S26, and if the determination is NO, the process proceeds to Step S27 (FIG. 5).

In Step S26, the control unit 30 (communication switching unit 31) sets a positioning information untransmitted flag and stores in the storage unit 50 that the GPS positioning result that is requested according to the emergency call is not replied.

Figure 5:
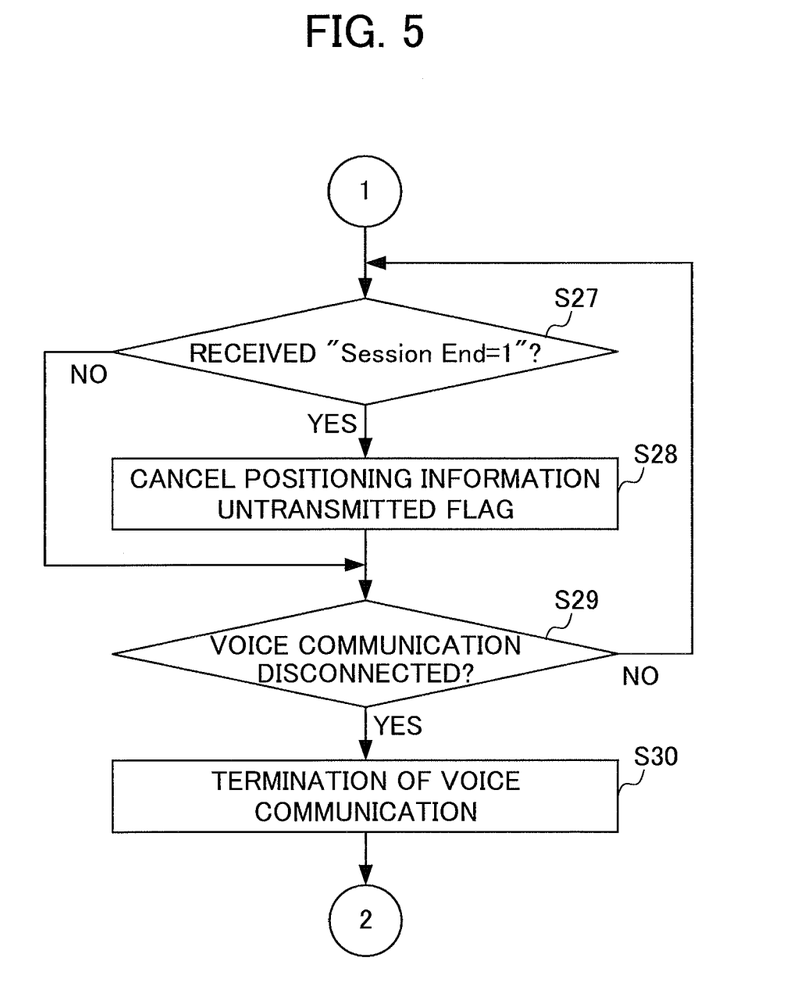
FIG. 5 is a flow chart showing processing until voice communication is completed in the mobile telephone device according to the embodiment of the present invention.

FIG. 5 is a flow chart showing processing until voice communication or SMS transmission is completed in the mobile telephone device 1 according to the present embodiment. It should be noted that this processing is performed following the processing shown in FIG. 4.

In a case of voice communication, in Step S27, the control unit 30 (communication switching unit 31) determines whether or not a GPS positioning result is replied from whether or not a flag indicating the termination of a session relating to GPS positioning (session end=1) is received during the communication. If the determination is YES, the process proceeds to Step S28, and if the determination is NO, the process proceeds to Step S29.

In Step S28, since it is determined in Step S27 that the GPS positioning result is replied, the control unit 30 (communication switching unit 31) cancels the positioning information untransmitted flag.

In Step S29, the control unit 30 determines whether or not to disconnect the voice communication or whether or not the SMS transmission is completed. If the determination is YES, the process proceeds to Step S30, and if the determination is NO, the process returns to Step S27.

In Step S30, the control unit 30 terminates the voice communication or SMS transmission in the CDMA communication system.

Figure 6:
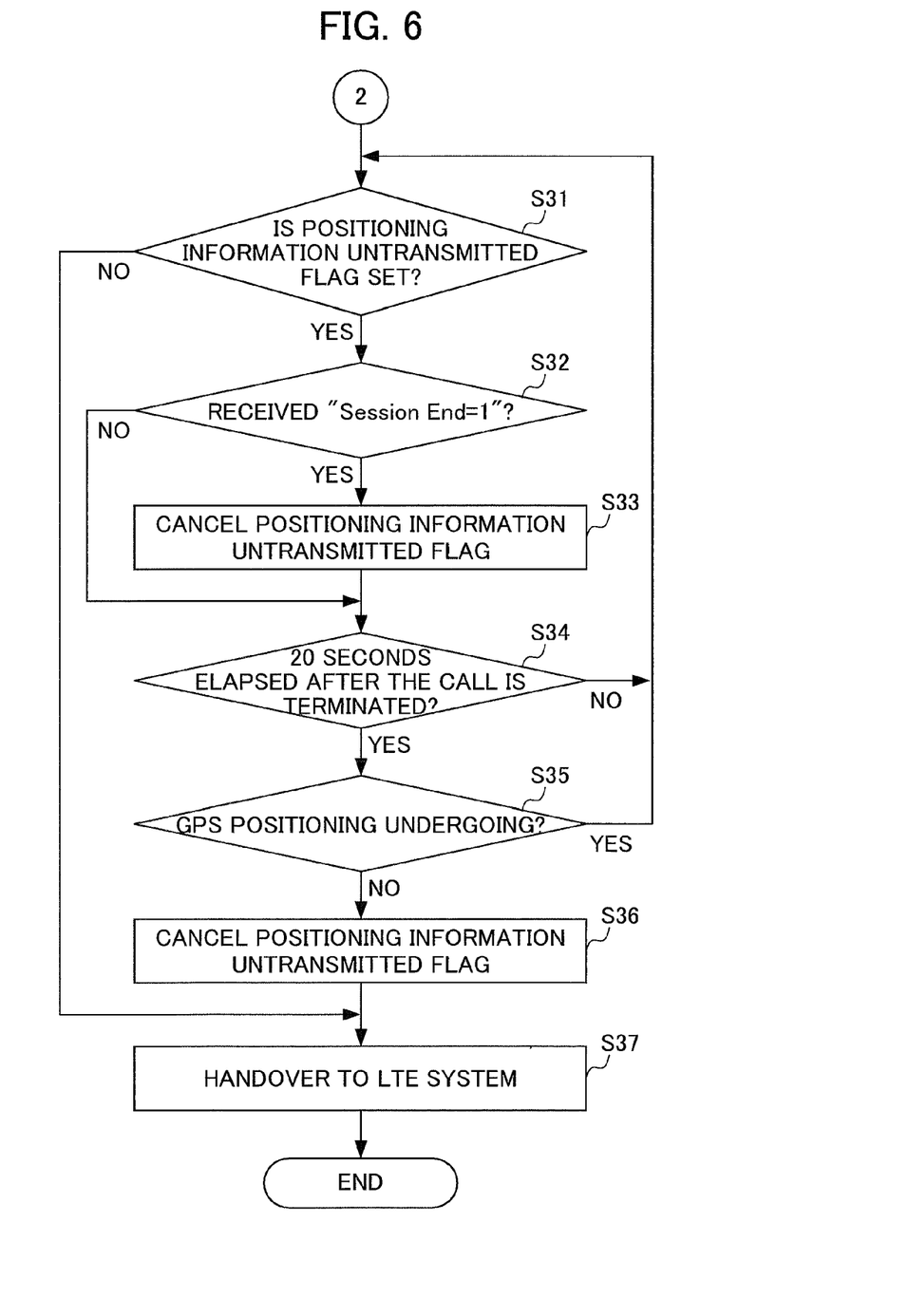
FIG. 6 is a flow chart showing processing from when voice communication is completed in the mobile telephone device according to the embodiment of the present invention.

FIG. 6 is a flow chart showing processing after terminating voice communication or SMS transmission in the mobile telephone device 1 according to the present embodiment. It should be noted that this processing is performed following the processing shown in FIG. 5.

In Step S31, the control unit 30 (communication switching unit 31) determines whether or not the positioning information untransmitted flag is set. If the determination is YES, the process proceeds to Step S32, and if the determination is NO, the process proceeds to Step S37.

In Step S32, the control unit 30 (communication switching unit 31) determines whether or not the result of GPS positioning is replied from whether or not a flag (Session end=1) indicating termination of a session relating to GPS positioning is received. If the determination is YES, the process proceeds to Step S33, and if the determination is NO, the process proceeds to Step S34.

In Step S33, since it is determined that the result of GPS positioning is replied in Step S32, the control unit 30 (communication switching unit 31) cancels the positioning information untransmitted flag.

In Step S34, the control unit 30 (communication switching unit 31) determines whether or not a predetermined time period (20 seconds) has elapsed since the completion of the voice communication. If the determination is YES, the process proceeds to Step S35, and if the determination is NO, the process returns to Step S31.

In Step S35, the control unit 30 (communication switching unit 31) refers to a utilization condition of the parameters (SO:35, 36) used for the communication for GPS positioning and determines whether or not the GPS positioning is undergoing. If the determination is YES, the process returns to Step S31 even if the predetermined time period has elapsed, and the control unit 30 waits for the termination of the undergoing GPS positioning. Meanwhile, if the determination is NO, the process proceeds to Step S36.

In Step S36, the control unit 30 (communication switching unit 31) determines that there is no request for GPS positioning based on an emergency call (or SMS transmission), and cancels the positioning information untransmitted flag.

In Step S37, the control unit 30 (communication switching unit 31) performs handover to the LTE communication system, which is given priority over the CDMA communication system, and returns to the communication standby state.

As described above, in accordance with the present embodiment, since the mobile telephone device 1 continues the location registration to the CDMA communication system even after the completion of the call upon communication initiation of a predetermined communication type (for example, emergency call and SMS transmission), it is possible to reply the result to the emergency authority (or one related to the user of the mobile telephone device 1 who desires location information of the mobile telephone device 1) by immediately performing GPS positioning when receiving a positioning request.

Figure 7:
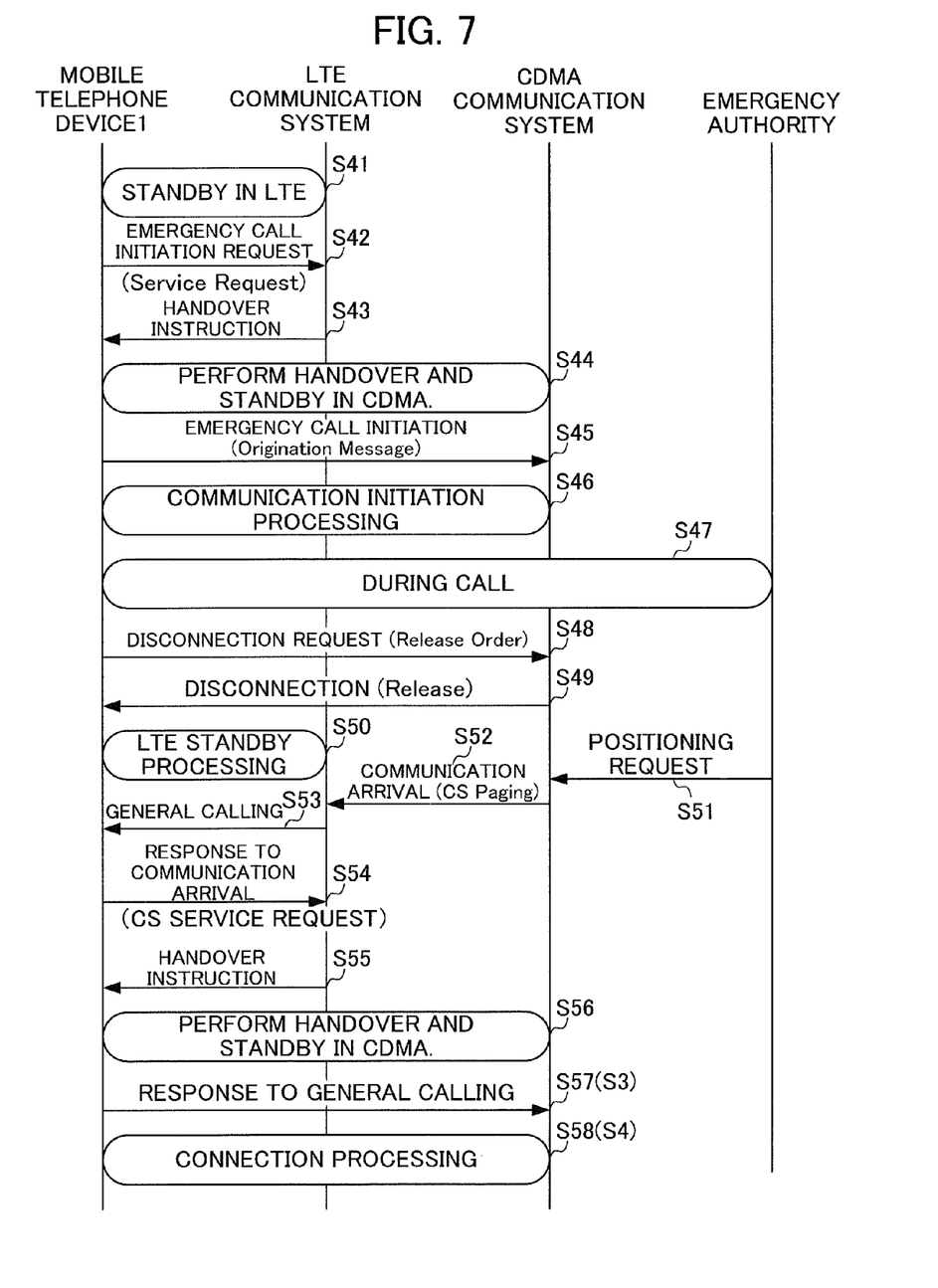
FIG. 7 is a sequence diagram showing processing based on an emergency call communication initiation in a case where determination of an emergency call is not performed by a determination unit according to the embodiment of the present invention.

FIG. 7 shows the processing based on emergency call initiation in a case where the mobile telephone device 1 has not performed a determination of an emergency call by the determination unit 32 according to the present embodiment for comparison. It should be noted that the same can also be applied to SMS transmission.

When there is a request for an emergency call initiation request from the mobile telephone device 1 (Step S42) during a communication standby state in the LTE communication system (Step S41), handover is instructed from the LTE communication system to the mobile telephone device 1 (Step S43). Then, after the handover to the CDMA communication system is performed and the state becomes in a communication standby state in the CDMA communication system (Step S44), the mobile telephone device 1 performs emergency call initiation in the CDMA communication system (Step S45), executes predetermined communication initiation processing (Step S46), and becomes in a state having a telephone call with the emergency authority (Step S47).

Thereafter, when disconnecting the voice communication (Step S49) in accordance with a disconnection request (Step S48), the mobile telephone device 1 returns to a standby state by performing handover to the LTE communication system, which is given priority over the CDMA communication system (Step S50).

Next, when the control device of the CDMA communication system receives a positioning request signal from the emergency authority, which is the destination of the emergency call (Step S51), communication arrival is notified to the LTE communication system by way of the CS Fallback function (Step S52) and the general calling is performed from the LTE communication system to the mobile telephone device 1 (Step S53). In response to this, since handover to the CDMA communication system is instructed (Step S55) when the communication arrival reply is performed to the LTE communication system (Step S54), the mobile telephone device 1 performs the handover and becomes in a communication standby state in the CDMA communication system (Step S56).

Then, the mobile telephone device 1 transmits to the CDMA communication system a response signal to the general calling (Step S57, which corresponds to Step S3 in FIG. 3) and starts a session for data communication relating to GPS positioning by performing connection processing (Step S58, which corresponds to Step S4 in FIG. 3). Thereafter, as in the processing in FIG. 3, the mobile telephone device 1 performs GPS positioning by a predetermined procedure.

Accordingly, when handover to the LTE communication system is performed immediately in response to termination of a telephone call, the mobile telephone device 1 needs to perform handover to the CDMA communication system again in Steps S52-S56 if there is a positioning request (Step S51). Therefore, there occurs delay in transmission of the positioning information to the emergency authority or increase in the processing load. However, in accordance with the present embodiment, the mobile telephone device 1 can perform communication more efficiently as compared with the example shown in FIG. 7 by avoiding disadvantages relating to the switching of the communication systems. It should be noted that, in the present embodiment, it is possible to obtain advantageous effects such as avoidance of delays in transmission of positioning information and avoidance of increase in processing load, not only in emergency calls but also in transmission of SMS.

In addition, in accordance with the present embodiment, in a case where the GPS positioning result is not replied after completion of the voice call (or SMS transmission), the mobile telephone device 1 waits handover to the LTE communication system until a predetermined time period elapses. Therefore, the mobile telephone device 1 can return to the LTE communication system at an appropriate timing up to a time limit (predetermined time) of transmission of the positioning request according to the emergency call (or SMS transmission). As a result, the mobile telephone device 1 can communicate more efficiently.

Although the embodiments of the present invention have been described in the above, the present invention is not limited to the embodiments described above. In addition, the effects described for the embodiments of the present invention are merely a result of exemplifying effects arising from the present invention, and the effects of the present invention are not limited to those described for the embodiments of the present invention.

The first communication system is not limited to an LTE type, and for example, it may be of a WiMAX type or the like as long as it is a type of communication that does not have a routine of communication initiation and arrival of voice or a routine of SMS transmission and reception, and the present invention is applicable as long as a function corresponding to the CS Fallback can be implemented with regard to communication initiation processing.

In addition, the wireless terminal device according to the present invention is not limited to a mobile telephone device 1. The present invention is applicable to various devices, such as a PHS (trademark: Personal Handyphone System), a PDA (Personal Digital Assistant), a gaming device, a navigation device, a personal computer, and a communication-dedicated module specialized in communication functions.

What is claimed is:

1. A wireless terminal device comprising:
   a communication switching unit that selectively switches between a first communication system and a second communication system, for performing communication; and
   a determination unit which, upon communication initiation being requested in a situation where a location registration is performed in the first communication system, determines whether or not the communication initiation is of a predetermined communication type of which positioning in the second communication system is requested after the communication initiation; wherein
   if it is determined by the determination unit that the communication initiation is not of the predetermined communication type, the communication switching unit changes a location registering destination by giving priority to the first communication system after communication based on the communication initiation is completed in the second communication system, and
   if it is determined that the communication initiation is of the predetermined communication type, the communication switching unit continues the location registration to the second communication system even after the communication based on the communication initiation is completed in the second communication system.

2. The wireless terminal device according to claim 1, wherein
   in a case where it is determined that the communication initiation is of the predetermined communication type by the determination unit and the positioning request is received prior to elapse of a predetermined time period, since the communication based on the communication initiation is completed in the second communication system, the communication switching unit transmits location information, and changes the location registering destination by giving priority to the first communication system after the transmission of the location information is completed.

3. The wireless terminal device according to claim 1, wherein in a case where it is determined that the communication initiation is of the predetermined communication type by the determination unit and a predetermined time period elapses without receiving the positioning request since the communication based on the communication initiation is completed in the second communication system, the communication switching unit changes the location registering destination by giving priority to the first communication system.

4. The wireless terminal device according to claim 1, wherein upon changing the location registering destination between the first communication system and the second communication system, the communication switching unit receives supplementary information for changing a connection counterpart from a control device of the first communication system that has knowledge of a locational relationship between a first communication area section in the first communication system and a second communication area section in the second communication system.

5. The wireless terminal device according to claim 1, wherein the predetermined communication type is an emergency call.

6. The wireless terminal device according to claim 1, wherein the predetermined communication type is SMS (short messaging service).

7. The wireless terminal device according to claim 1, wherein the first communication system is of an LTE type and the second communication system is of a CDMA type.

8. The wireless terminal device according to claim 1, wherein the first communication system is of a WiMAX type and the second communication system is of a CDMA type.

9. The wireless terminal device according to claim 4, wherein the first communication system is of an LTE type and the second communication system is of a CDMA type, and the reception of the supplementary information complies with a CS-Fallback function defined in 3GPP TS 23.272.

10. A communication control method executed by a wireless terminal device, comprising:

a communication switching step that selectively switches between a first communication system and a second communication system, for performing communication; and a determination step which, upon communication initiation being requested in a situation where a location registration is performed in the first communication system, determines whether or not the communication initiation is of a predetermined communication type of which positioning in the second communication system is requested after the communication initiation; wherein if it is determined in the determination step that the communication initiation is not of the predetermined communication type, a location registering destination is changed in the communication switching step by giving priority to the first communication system after communication based on the communication initiation is completed in the second communication system, and if it is determined that the communication initiation is of the predetermined communication type, the location registration to the second communication system is continued in the communication switching step even after the communication based on the communication initiation is completed in the second communication system.

* * * * *